United States Patent [19]
Gordon

[11] Patent Number: 5,884,156
[45] Date of Patent: Mar. 16, 1999

US005884156A

[54] PORTABLE COMMUNICATION DEVICE

[75] Inventor: Mark Menny Gordon, Fairlawn, N.J.

[73] Assignee: Geotek Communications Inc., Montvale, N.J.

[21] Appl. No.: 602,497

[22] Filed: Feb. 20, 1996

[51] Int. Cl.$^6$ .................................................. H04B 1/38
[52] U.S. Cl. ...................... 455/350; 455/552; 455/575
[58] Field of Search .................... 455/74, 550, 552, 455/553, 350, 351, 426, 425, 518, 569, 200.1, 219, 234.1, 234.2, 142; 379/433, 420; 381/183, 187, 74

[56] References Cited

U.S. PATENT DOCUMENTS

| | | | |
|---|---|---|---|
| 3,659,050 | 4/1972 | Carlsson et al. | 379/420 |
| 5,175,872 | 12/1992 | Borras | 455/76 |
| 5,179,721 | 1/1993 | Comroe et al. | 455/426 |
| 5,212,722 | 5/1993 | Murata | 379/420 |
| 5,224,151 | 6/1993 | Bowen et al. | 379/58 |
| 5,337,353 | 8/1994 | Boie et al. | 378/388 |
| 5,448,620 | 9/1995 | Gershkovich | 379/58 |
| 5,450,618 | 9/1995 | Naddell et al. | 455/575 |

*Primary Examiner*—Chi H. Pham
*Assistant Examiner*—Marsha D. Banks-Harold
*Attorney, Agent, or Firm*—Glen M. Diehl

[57] ABSTRACT

A portable communication device capable of operating in a telephony mode and in a dispatch mode is disclosed. The device includes a proximity sensor and a first speaker mounted on a front panel and a second speaker mounted on a rear panel. The operation of the speakers is controlled in accordance with the operational state of the device as well as the output of the proximity sensor.

24 Claims, 3 Drawing Sheets

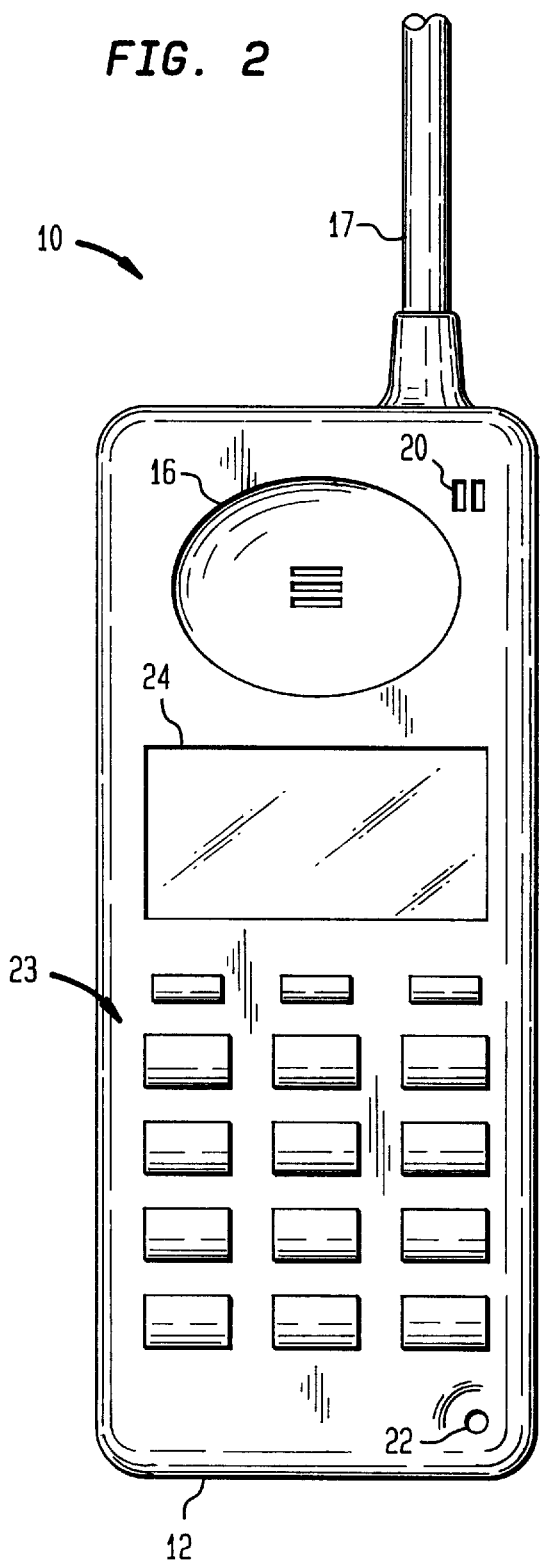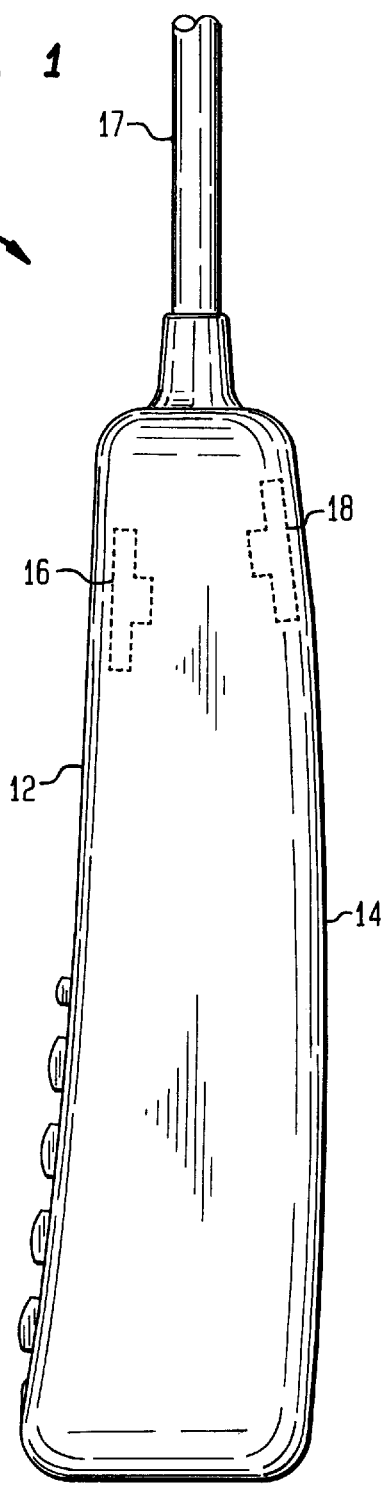

PORTABLE COMMUNICATION DEVICE

BACKGROUND OF THE INVENTION

The present invention relates to radio communications. More specifically, it relates to a portable radio communication device that provides communications in a telephony mode and in a radio dispatch mode.

Recently, telephony communications and radio dispatch communications have been provided in a single portable communications device. For example, communications in the frequency bands that the Specialized Mobile Radio (SMR) industry utilizes now provide a user with the ability to communicate with a dispatcher in a radio dispatch mode as well as the ability to communicate over a PSTN link in a telephony mode.

Normally, a user of a portable communication device will communicate in a telephony mode by using the communication device just as a telephone would be used. That is, the microphone in the communication device is placed next to the user's mouth and the receiver or speaker in the communication device is placed next to the user's ear. The speaker need only be capable of broadcasting a low power audio signal, since the user's ear is next to the speaker. Conversely, when a portable communication device is used in a radio dispatch mode, the device is usually either held in a user's belt or is held in front of the user's face so that the speaker is not next to the user's ear. As a result, a dispatch speaker must be capable of providing a higher power audio signal.

Portable communication devices using a single speaker have been suggested to provide communications in a radio dispatch mode and in a telephony mode. See, for example, the portable radio, model number Viking CX, manufactured by E. F. Johnson. See, also, U.S. Pat. No. 5,276,916, issued to Pawlish. These devices, however, do not allow a user to communicate in the dispatch mode in the normal way. All of these devices also suffer from the drawback of attempting to provide diverse operational capabilities—one requiring a low audio signal and the other requiring a high audio signal—using a single speaker. Other approaches have been suggested. For example, a communication device having two speakers on the same side of the portable communication device is disclosed in U.S. Pat. No. 5,448,620, issued to Gershkovich.

Accordingly, new communication devices for providing improved telephony and radio dispatch communications are needed.

SUMMARY OF THE INVENTION

The present invention provides a portable communication device capable of providing telephony communications and radio dispatch communications. The portable communications device includes a housing, a first speaker located on a first side of the housing, a second speaker located on a second side of the housing and a proximity sensor. The proximity sensor is preferably located adjacent the first speaker and determines when a user is near the first side of the housing and the operation of the first and second speaker is controlled accordingly. More specifically, the proximity sensor determines when a user is holding the portable communication device as a telephone would be held. Thus, the proximity sensor determines when the first speaker is near the user's ear.

In accordance with a preferred embodiment, the proximity sensor determines when the first speaker is within close proximity, for example, within one inch, of the person. The range can be adjustable and a range up to five inches is preferred. Also, the speakers are preferably located on opposite sides of the housing of the communication device.

Audio signals in the communication device are preferably controlled in accordance with the mode of operation of the communication device as well as the state of the proximity sensor. If the communication device is in a telephony mode, a low volume audio signal is sent to the first speaker, regardless of the state of the proximity sensor. If the communication device is in a dispatch mode and the proximity sensor senses that there is no user near the first side of the housing, a high volume audio signal is sent to the first speaker. However, if the communication device is in the dispatch mode and the proximity sensor senses that the user is near the first side of the housing, a high volume audio signal is sent to the second speaker and a low volume audio signal is sent to the first speaker.

The invention will now be further described in connection with certain illustrated embodiments; however, it should be clear to those skilled in the art that various modifications, additions and subtractions can be made without departing from the spirit and scope of the claims.

DESCRIPTION OF THE DRAWINGS

FIG. 1 illustrates a side sectional view of the portable communication device in accordance with the present invention;

FIG. 2 illustrates a front view of the portable communication device in accordance with the present invention;

DESCRIPTION OF THE PREFERRED EMBODIMENT

Figure 3:
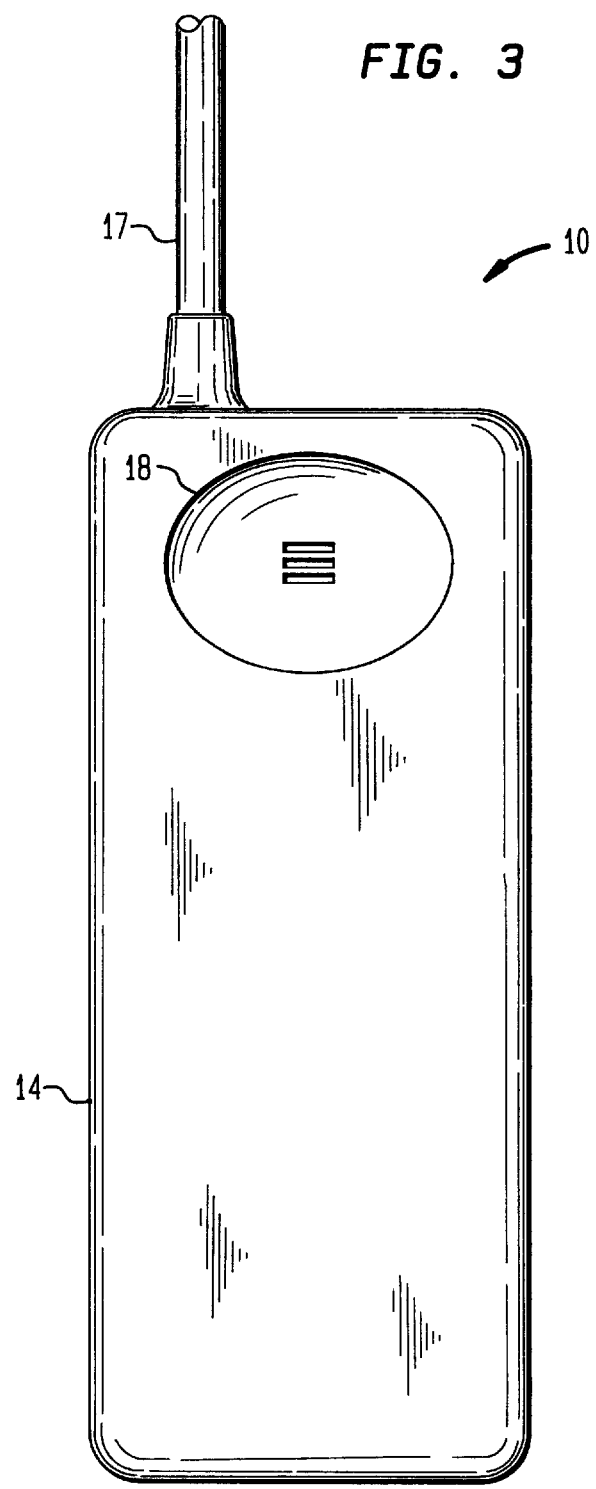
FIG. 3 illustrates a rear view of the portable communication device in accordance with the present invention.

Referring to FIG. 1, a side sectional view of a portable communication device 10 in accordance with the present invention is illustrated. The communication device 10 includes a front panel 12 and a rear panel 14. A front speaker 16 is mounted to broadcast audio signals from the front panel 12. The front speaker 16 is preferably mounted at the top of the housing of the communication device 10 near the antenna 17. In this position, the speaker 16 will be positioned next to a user's ear when the communication device is held in the conventional telephone position. A second speaker 18 is mounted in the rear of the housing of the communication device to broadcast audio signals from the rear panel 14. The speakers 16 and 18 are both preferably capable of providing high volume and low volume audio signals.

Referring to FIG. 2, a front view of the portable communication device 10 is shown. In addition to the speaker 16, a proximity sensor 20 and a microphone 22 are preferably mounted on the front panel 12 of the housing of the communication device. The proximity sensor 20 is preferably mounted adjacent the front speaker 16 at the top of the front panel 12. This position is preferred as it increases the likelihood that the sensor 20 will detect a user's ear or the side of the user's face next to the front speaker 16 when the device 10 is held like a conventional telephone. Other locations of the proximity sensor 20, however, can be utilized. The microphone 22 is preferably located at the other end of the housing of the communication device 10 so that it will be located next to the user's mouth when the device 10 is held in the same manner as a conventional telephone. As is conventional with most portable communication devices, a keypad 23 and a display 24 are also provided on the front panel 12.

Referring to FIG. 3, a rear view of the portable communication device is shown. As previously described, the speaker 18 is mounted on the rear panel 14 to project audio signals from the rear of the device.

Figure 4:
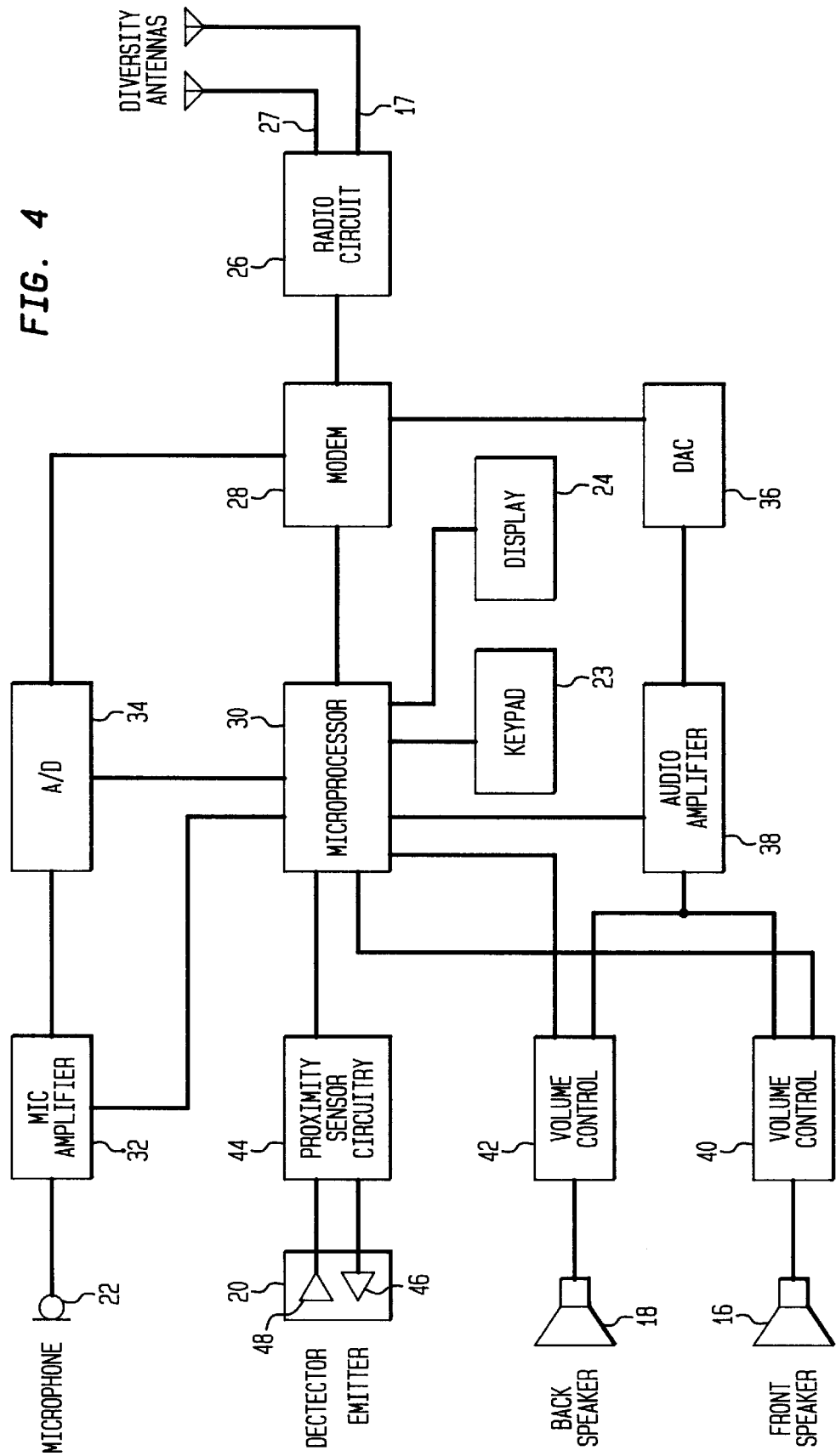
FIG. 4 illustrates a preferred embodiment of the circuitry of the portable communication device.

FIG. 4 illustrates the circuitry in the portable communication device 10 that is used to interface with the speakers 16 and 18, the antenna 17, the sensor 20, the microphone 22, the keypad 23 and the display 24. The circuit includes a radio circuit 26 that provides the radio communications with a central station, including the ability to transmit and receive communication signals. The radio circuit 26 can provide communications in accordance with a number of different protocols. By way of example only, TDMA, CDMA or frequency hopping systems can be utilized by selecting the appropriate radio circuit 26, as is well known in the art. Further, the radio circuit 26 can be analog or digital circuitry, as desired. Also, a second diversity antenna 27 can be provided. If diversity reception is used, it is preferred to provide parallel receive paths and then select the signal having the better receive characteristics.

The radio circuit 26 sends and receives communication signals to and from a modem 28 whose operation is controlled by a microprocessor 30. Voice signals from a user of the device 10 are picked up by the microphone 22, amplified by the microphone amplifier 32 under control of the microprocessor 30 and converted to a digital signal by an analog to digital converter 34. The digital signals are provided to the modem 28 and then to the radio circuit 26 for transmission to the base station.

Voice signals received by the device 10 on its antenna 17 (and on antenna 27 if diversity reception is used) are sent from the modem 28 to a digital to analog converter 36 (if the signals are digital) where the signals are converted to an analog format for the speakers 16 and 18. The signals are then sent to an audio amplifier 38 where the volume level of the signals is controlled in accordance with an input from the microprocessor 30. In accordance with a preferred embodiment, the microprocessor 30 sets the level of amplification in the audio amplifier 38 in accordance with a selection made by the user on the keypad 23. Then the amplified signal is provided to a volume control circuit 40 for the front speaker 16 and to a volume control circuit 36 for the rear speaker 42.

The volume control circuits 40 and 42 are controlled by the microprocessor 30 in accordance with the signal received from the sensor 20. As previously described, the sensor 20 detects when a user of the device 10 is near the device 10. The output of the sensor 20 is processed by a proximity sensor circuit 44 and then supplied to the microprocessor 30. The microprocessor 30, therefore, determines from the sensor 20 whether the user of the device 10 is near the device.

The sensor 20 is preferably an infrared light which has an emitter 46 and a detector 48. The emitter 46 transmits a modulated infrared signal which may be reflected by an object that is in the path of the emitted infrared light. The most likely reflector will be a user's face or ear when the communication device 10 is placed next to the user's face. A reflected signal is detected by the detector 48 and sent to the proximity sensor circuit 44. The proximity sensor circuit 44 determines the strength of the relected signal. This level is supplied to the microprocessor 30. The microprocessor 30 compares the level to a preset threshold in the microprocessor 30 to determine whether a user is located within a predetermined range of the communication device 10. In accordance with a preferred embodiment of the present invention, the microprocessor 10 determines whether the user is located within a selectable range, preferably within one to five inches of the device 10. Such proximity detection circuits are well known.

While an infrared light detector 20 is preferred due to the accurate distance determination that is possible, any other type of sensor can be used. For example, ultrasonic detectors and capacitive detectors can also be used.

As mentioned earlier, the microprocessor 30 controls the operation of the volume control circuits 40 and 42 in accordance with the signal it receives from the sensor 20. The microprocessor 30 also senses the operational mode of the communication device 10 to control the volume control circuits 40 and 42.

The communication device 10 preferably has at least two operational modes. These are the active telephony mode and the active dispatch mode. In the active telephony mode, the communication device is either being set up to place a telephone call or is connected through the base station over the Public Switch Telephone Network (PSTN) or over a private network. During this mode, the communication device 10 is preferably held in the same fashion as a conventional telephone. In the active dispatch mode, the communication device is either being set up to make a dispatch or is being used to receive dispatch communications from and to converse with a dispatcher or another mobile subscriber, as is well known. When the communication device 10 is not in the active telephony mode or in the active dispatch mode, it is in the idle mode.

The mode of operation can be controlled by user selection on the keypad 23. The microprocessor 30 detects the user's selection and controls the mode of the communication device 10 accordingly. It can also be controlled by the type of communication signal received by the communication device 10. For example, the signal will generally contain a header that specifies whether the communication signal is a telephone call or a dispatch. The header is detected by the microprocessor 30 and the mode of the communication device 10 is controlled accordingly.

The preferred method of controlling the operation of the volume control circuits 40 and 42 by the microprocessor 30 will now be discussed. In accordance with a preferred embodiment of the present invention, the volume control circuits 40 and 42, if enabled, operate to set the volume of audio signals to one of two levels. These are a lower level and a higher level. At the lower level, the volume control circuits 40 and 42 cause a low volume audio signal to be supplied to the speakers 16 and 18, respectively. At the higher level, the volume control circuits 40 and 42 cause a high volume audio signal to be supplied to the speakers 16 and 18, respectively.

If the microprocessor 30 detects that the communication device 10 is in the active telephony mode, then the microprocessor 30 disables the volume control circuit 42 which controls the audio level supplied to the rear speaker 18 and enables the volume control circuit 40 which controls the audio level supplied to the front speaker 16 at a low level. Thus, in the active telephony mode, low volume audio signals are broadcast from the front speaker 16 by the communication device 10 while the rear speaker 18 broadcasts nothing.

If the microprocessor 30 detects that the communication device 10 is in the active dispatch mode, then the microprocessor 30 controls the volume control circuits 40 and 42 in accordance with the output of the proximity sensor 20. If the sensor 20 and the microprocessor 30 determine that there is no user near the front panel 12 of the communication device 10, the microprocessor 30, in the preferred embodiment, disables the volume control circuit 42 and enables the volume control circuit 40 at a high level. Thus, high volume audio signals are broadcast from the front speaker 16 and no signals are broadcast from the rear speaker 18 when the communication device is in the active dispatch mode and the device 10 is not positioned near the user's ear. In an alternate embodiment, the volume control circuit 42 can also be enabled, at either the low or the high level. In this case, the device 10 will also broadcast audio through the rear speaker 18.

On the other hand, if the proximity sensor 20 and the microprocessor 30 determine that the device 10 is positioned near the user's ear, then the microprocessor 30 enables the volume control circuit 42 at the high level. Thus, when the communication device 10 is in the dispatch mode and the device is positioned near the user's ear, a high volume audio signal is sent to the rear speaker 18. The volume control circuit 40 can either be disabled, in which case no audio signal will be broadcast by the front speaker 16, or the volume control circuit 40 can be set to operate at a low level, in which case a low volume audio signal will be broadcast from the front speaker 16.

It is also possible for the communication device 10 to be operating in the active telephony mode and have a dispatch come in during a telephone call. In this case, the microprocessor 30 has already disabled the volume control circuit 42 and enabled the volume control circuit 44 at a low level to operate in the telephony mode. When the microprocessor 30 detects the incoming dispatch, it preferably controls the volume control circuits 40 and 42 in the same manner as is done in the telephony mode. However, the microprocessor 30 also preferably controls the modem 28 to cause the telephone call to be placed on hold and to direct the dispatch communication to the front speaker 16. Thus, when a dispatch interrupts a telephone call, the dispatch is broadcast from the front speaker 16 at a low audio volume.

It is also possible for the communication device 10 to receive special types of communication signals called alerts. Alerts are utilized by a dispatcher to send emergency communications to the portable communication device 10. As before, the microprocessor 30 detects alerts by examining the headers of each signal it receives. If the microprocessor 30 detects an alert while the communication device 10 is in an idle mode (i.e. not in the telephony mode or in the dispatch mode), then the operation of the speakers 16 and 18 is controlled in accordance with the output of the sensor 20. If the sensor 20 and the microprocessor 30 determine that the user's ear is not near the front housing 12, then the volume control circuit 40 is enabled at the high level so that a high volume audio signal is sent to the front speaker 16. The volume control circuit 42 is preferably disabled so that nothing is broadcast from the rear speaker 18.

On the other hand, if the sensor 20 and the microprocessor 30 determine that the user's ear is near the front panel 12, then the microprocessor 30 disables the volume control circuit 40 and enables the volume control circuit 42 at the high level so that a high volume audio signal is sent to the rear speaker 18. The column control circuit 40 is preferably disabled.

If the alert is generated while the device 10 is in the dispatch mode, the microprocessor 30 controls the volume control circuits 40 and 42 in the same manner as if the device were in the idle mode, which was just described. If the alert is generated while the device 10 is in the active telephony mode, then the microprocessor 30 enables the volume control circuit 40 at the low level so that a low volume audio signal is sent to the front speaker 16. The volume control circuit 42 is preferably disabled.

It is understood that changes may be made in the above description without departing from the scope of the invention. It is accordingly intended that all matter contained in the above description and in the drawings be interpreted as illustrative rather than limiting.

I claim:

1. A portable communication device capable of providing telephony communications and radio dispatch communications, comprising:

a housing;

a first speaker located on a first side of the housing at one end of the housing;

a second speaker located on a second side of the housing;

sensor means for determining when the first speaker is near user and for determining the operation of the first and second speaker in accordance with the output of the sensor means.

2. The claim of claim 1, wherein the sensor means determines when the first speaker is within one to five inches of the person.

3. The claim of claim 2, wherein the distance is adjustable.

4. The claim of claim 1, further comprising a microphone located on the first side of the housing.

5. The claim of claim 4, wherein the microphone is located at a second end of the housing.

6. The claim of claim 1, wherein the second side of the housing is opposite the first side of the housing.

7. The claim of claim 1, wherein the first side of the housing is the front of the communication device and the second side of the housing is the rear of the communication device.

8. The claim of claim 1, wherein the audio signals in the communication device are controlled as follows:

if the communication device is in a telephony mode, a low volume audio signal is sent to the first speaker;

if the communication device is in a dispatch mode and the sensor means senses that there is no user near the first side of the housing, a high volume audio signal is sent to the first speaker; and if the communication device is in the dispatch mode and the sensor means senses that the user is near the first side of the housing, a high volume audio signal is sent to the second speaker.

9. The claim of claim 8, wherein the audio signals are controlled as follows:

if the communication device is in the telephony mode and a dispatch is directed to the device, a low volume audio signal is transmitted to the first speaker.

10. The claim of claim 9, wherein the low volume audio signal is the dispatch communication.

11. The claim of claim 8, wherein alert communication signals directed to the communication device are handled as follows:

if the alert is generated while the communication device is in an idle mode or in the dispatch mode, then:

if the sensor means senses that there is no user near the first side of the housing, a high volume audio signal is sent to the first speaker; and if the sensor means senses that the user is near the first side of the housing, a high volume audio signal is sent to the second speaker;

if the alert is generated while the communication device is in the telephony mode, then a low volume audio signal is sent to the first speaker.

12. The claim of claim 1, wherein a low volume audio signal is sent to the first speaker if the communication device is in a telephony mode.

13. The claim of claim 1, wherein the communication device, during a dispatch mode of operation, is controlled as follows:

if the sensor means senses that there is no user near the first side of the housing, a high volume audio signal is sent to the first speaker; and if the sensor means senses that the user is near the first side of the housing, a high volume audio signal is sent to the second speaker.

14. A method of providing telephony and radio dispatch communications in a portable communication device having a front panel with a proximity sensor and a first speaker mounted thereon and having a second panel having a second speaker mounter thereon, comprising the steps of:

if the communication device is in a telephony mode, broadcasting a low volume audio signal from the first speaker;

if the communication device is in a dispatch mode and the proximity sensor senses that there is no user near the front panel, broadcasting a high volume audio signal from the first speaker; and if the communication device is in the dispatch mode and the proximity sensor senses that the user is near the front panel, broadcasting a high volume audio signal from the second speaker.

15. The claim of claim 14, further comprising the step of broadcasting a low volume audio signal from the first speaker if the communication device is in the telephony mode and a dispatch is directed to the device.

16. The claim of claim 15, wherein the low volume audio signal is the dispatch communication.

17. The claim of claim 14, further comprising the steps of handling alert communication signals directed to the communication device as follows:

if the alert is generated while the communication device is in an idle mode or in the dispatch mode, then:

if the proximity sensor senses that there is no user near the front panel, broadcasting a high volume audio signal from the first speaker; and if the proximity sensor senses that the user is near the front panel, broadcasting a high volume audio signal from the second speaker;

if the alert is generated while the communication device is in the telephony mode, then broadcasting a low volume audio signal from the first speaker.

18. A portable communication device capable of providing telephony communications and radio dispatch communications, comprising:

a housing;

a first speaker located on a first side of the housing at one end of the housing;

a second speaker located on a second side of the housing;

a proximity sensor located on the first side of the housing; and control means for controlling the operation of the first and second speaker in accordance with the output of the proximity sensor.

19. The claim of claim 18, wherein the proximity sensor is located adjacent the first speaker.

20. The claim of claim 19, further comprising a microphone located on the first side of the housing.

21. The claim of claim 18, wherein the first side of the housing is the front of the communication device and the second side of the housing is the rear of the communication device.

22. The claim of claim 18, wherein the control means operates as follows:

if the communication device is in a telephony mode, a low volume audio signal is sent to the first speaker;

if the communication device is in a dispatch mode and the sensor means senses that there is no user near the first side of the housing, a high volume audio signal is sent to the first speaker; and if the communication device is in the dispatch mode and the sensor means senses that the user is near the first side of the housing, a high volume audio signal is sent to the second speaker.

23. The claim of claim 18, wherein the control means operates as follows:

if the communication device is in the telephony mode and a dispatch is directed to the device, a low volume audio signal is transmitted to the first speaker.

24. The claim of claim 23, wherein the low volume audio signal is the dispatch communication.

* * * * *